(12) United States Patent
Ahlquist

(10) Patent No.: US 8,572,374 B2
(45) Date of Patent: Oct. 29, 2013

(54) CONTINUOUS ISOCHRONOUS READ ACCESS AND MEASUREMENT OF DATA STORED IN NON-VOLATILE MEMORY

(75) Inventor: Brent M. Ahlquist, Loomis, CA (US)

(73) Assignee: Intel Corporation, Santa Clara, CA (US)

( * ) Notice: Subject to any disclaimer, the term of this patent is extended or adjusted under 35 U.S.C. 154(b) by 1454 days.

(21) Appl. No.: 11/799,989

(22) Filed: May 3, 2007

(65) Prior Publication Data

US 2008/0276088 A1    Nov. 6, 2008

(51) Int. Cl.
*G06F 21/00*          (2013.01)
(52) U.S. Cl.
USPC ............................. 713/168; 713/162; 714/819

(58) Field of Classification Search
None
See application file for complete search history.

(56) References Cited

U.S. PATENT DOCUMENTS

| 7,298,840 | B2 * | 11/2007 | Gehrmann et al. | 380/36 |
| 2003/0072454 | A1 * | 4/2003 | Krawetz | 380/284 |
| 2006/0036853 | A1 * | 2/2006 | Chen et al. | 713/161 |

* cited by examiner

*Primary Examiner* — Gilberto Barron, Jr.
*Assistant Examiner* — Izunna Okeke
(74) *Attorney, Agent, or Firm* — Kacvinsky Daisak PLLC

(57) ABSTRACT

A measurement and authentication engine in a nonvolatile memory computes an original hash value on data read from the nonvolatile memory. A measurement and authentication engine in a host processor recomputes the hash value on the data received from nonvolatile memory and checks that the computed hash value matches the hash value generated and transferred from the nonvolatile memory.

15 Claims, 3 Drawing Sheets

Isochronous Integrity Check - HOST Side

CONTINUOUS ISOCHRONOUS READ ACCESS AND MEASUREMENT OF DATA STORED IN NON-VOLATILE MEMORY

Technological developments permit digitization and compression of large amounts of voice, video, imaging, and data information. Evolving applications have greatly increased the need for large amounts of data storage and increased memory capabilities to handle data transfers from one device to another. Providing a way to check the integrity of information that is stored and transmitted over a network is a prime necessity in the world of communications. Improvements to the mechanisms that provide such integrity checks are needed.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
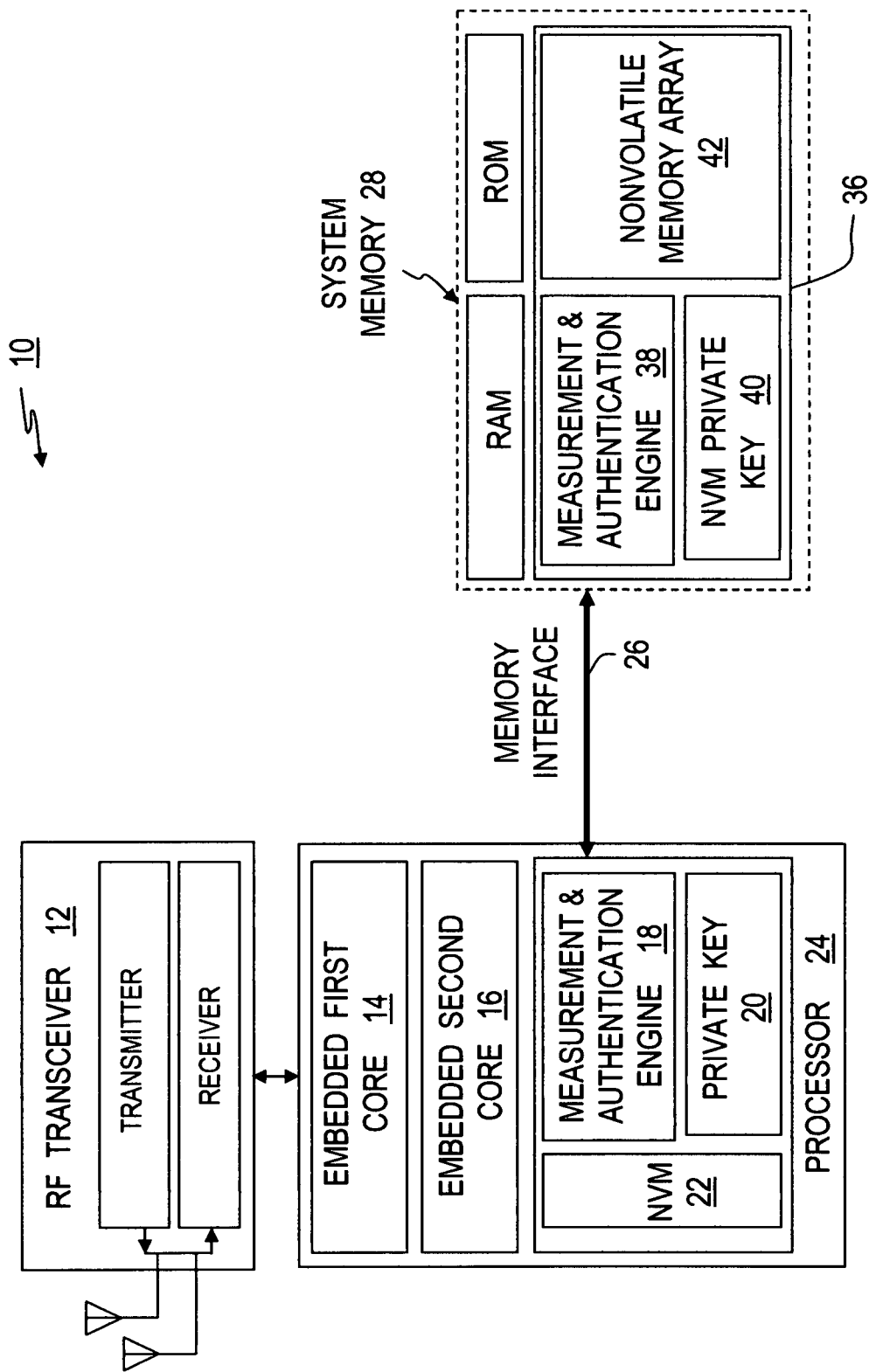
FIG. 1 is a block diagram that illustrates a wireless device that executes algorithms to provide integrity checks of returned nonvolatile memory data based on an authentication scheme in accordance with the present invention.

It will be appreciated that for simplicity and clarity of illustration, elements illustrated in the figures have not necessarily been drawn to scale. For example, the dimensions of some of the elements may be exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

The embodiment illustrated in FIG. 1 shows a wireless communications device 10 that includes one or more radios to allow communication with other over-the-air communication devices. Communications device 10 may operate in wireless networks such as, for example, Wireless Fidelity (Wi-Fi) that provides the underlying technology of Wireless Local Area Network (WLAN) based on the IEEE 802.11 specifications, WiMax and Mobile WiMax based on IEEE 802.16-2005, Wideband Code Division Multiple Access (WCDMA), and Global System for Mobile Communications (GSM) networks, although the present invention is not limited to operate in only these networks.

The radio systems collocated in the same platform of communications device 10 provide the capability of communicating in an RF/location space with the other devices in the network, but it should be noted that the present invention is not limited to wireless applications and may be used in a variety of products. For instance, the claimed subject matter may be incorporated into desktop computers, laptops, smart phones, MP3 players, cameras, communicators and Personal Digital Assistants (PDAs), medical or biotech equipment, automotive safety and protective equipment, automotive infotainment products, etc. It should be understood that the scope of the present invention is not limited to these examples.

The wireless embodiment illustrates a coupling of antenna(s) to the transceiver 12 to accommodate modulation/demodulation. In general, analog front end transceiver 12 may be a stand-alone Radio Frequency (RF) discrete or integrated analog circuit, or transceiver 12 may be embedded with a processor 24 as a mixed-mode integrated circuit where the processor processes functions that fetch instructions, generate decodes, find operands, and perform appropriate actions, then stores results. The processor 24 may include baseband and applications processing functions and utilize one or more processor cores 14 and 16 to handle application functions and allow processing workloads to be shared across the cores. The processor 24 may transfer data through an interface 26 to memory storage in a system memory 28.

FIG. 1 further illustrates functional blocks that execute algorithms in accordance with embodiments of the present invention to provide integrity checks based on an authentication scheme. Accordingly, processor 24 is embedded with a measurement & authentication engine 18, a private key 20 and a nonvolatile memory NVM 22; and nonvolatile memory 36 is embedded with a measurement & authentication engine 38, a NVM private key 40 and nonvolatile memory array 42. These functional blocks located on both sides of memory interface 26 share an identical key. In other words, the NVM private key 40 and the host private key are the same in order to validate information transferred between the processor and the nonvolatile memory.

The hash-based HMAC may be a one-way hashed key authentication scheme or a split checksum. Measurement & authentication engine 18 executes a HMAC authentication scheme that subsequently signs the measurement and any supplementary command related information (SHA-1, HMAC). In a preferred embodiment, measurement & authentication engine 18 runs a one-way keyed hashing algorithm for both measurement and authentication using a symmetric private key stored on both the NVM device and the host device. The relevant supplementary command related information may be accumulated with the measurement.

Figure 2:
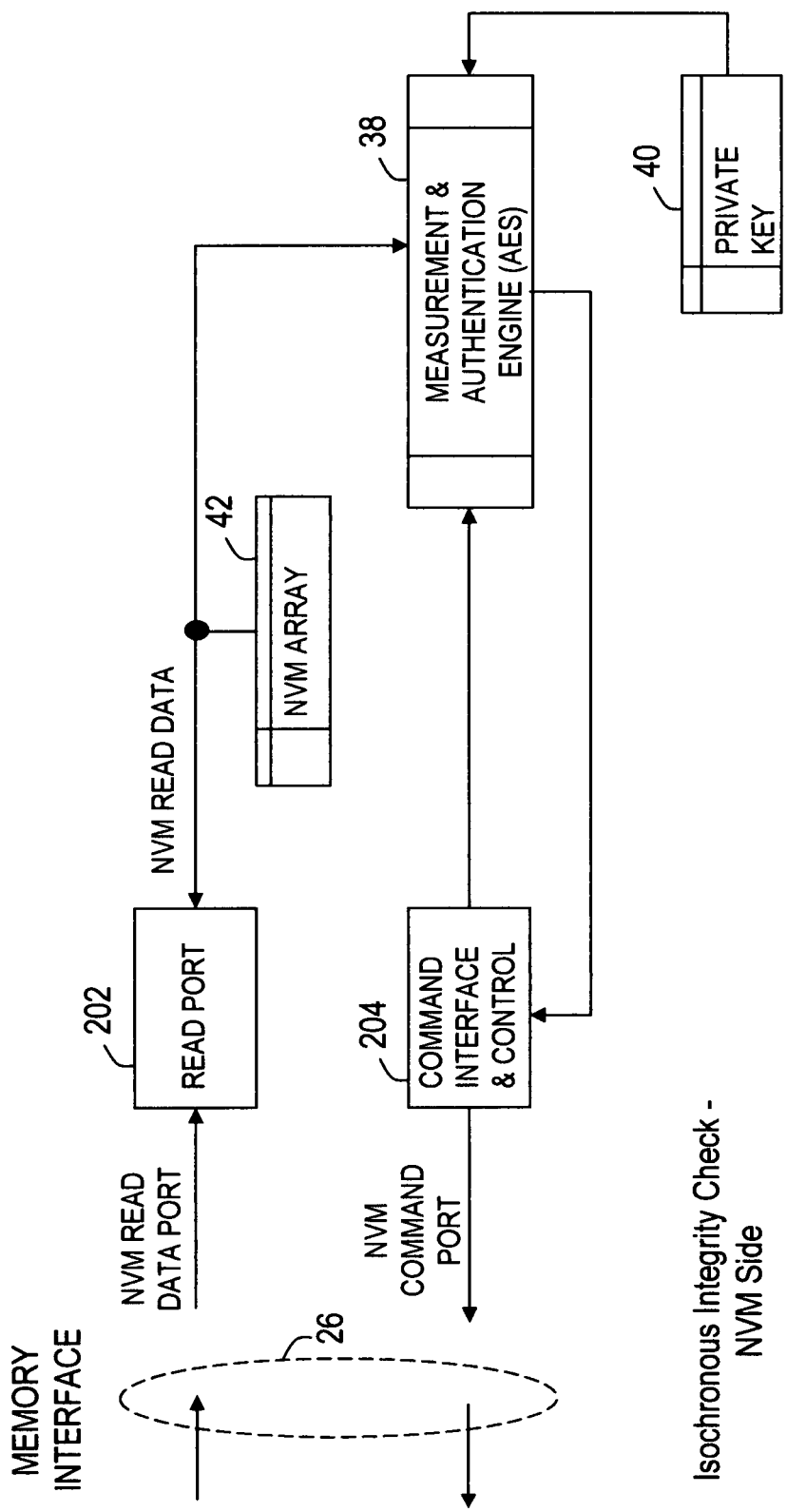
FIG. 2 is a block diagram that describes functions to perform an isochronous integrity check of data on the nonvolatile memory side.

FIG. 2 is a block diagram that describes functions to perform an isochronous integrity check of data on the nonvolatile memory side. The figure shows a read port 202 that receives NVM data over the memory interface 26 to store in the nonvolatile memory array 42. The measurement & authentication engine 38 is an internal engine within the NVM device that continuously measures, within the restrictions of the measurement algorithm, the data read from the core NVM device memory. Private keys stored within the nonvolatile memory and the processor are identical keys. A command interface & control block 204 connects the measurement & authentication engine 38 via memory interface 26 to the processor 24 and is used for verification of authentication material HMAC or One-Way Hash material passed from the NVM to the host upon request.

The measurement & authentication engine 38 accumulates a measurement over a range of NVM. The NVM data may be fed into a one-way hash or some other algorithm (SHA-1, checksum) to produce a message or a level of uniqueness which is cryptographically combined with the measurement with the secret key known only to the recipient of the measurement. The overall security of the authentication scheme has some dependence on the measurement algorithm. For example, a simple checksum is less secure than a one-way hash (SHA-1).

In operation, a command issued by the host processor such as, for example, the command "INITIATE MEASURE" initiates a current measurement. Another command issued by the host processor such as the command "MEASURE" causes authentication material based on the authentication scheme to be transferred externally, an appropriately authenticated version of the current accumulated measurement of the data to be read externally since the last invoked "INITIATE MEASURE" or "MEASURE" command, and any other command related data to guarantee the integrity and authenticity of the transferred command results.

Figure 3:
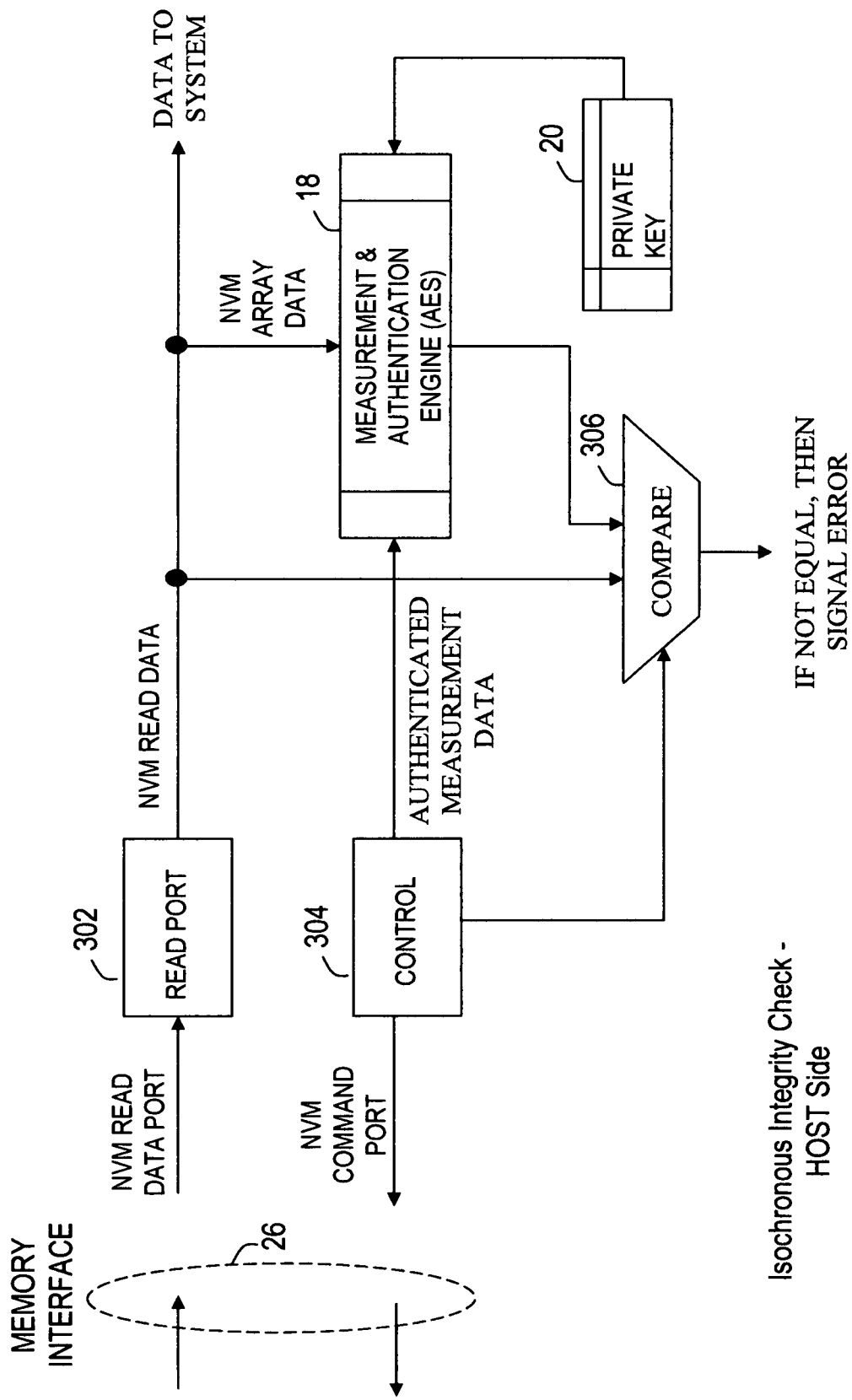
FIG. 3 shows a block diagram that facilitates an isochronous integrity check of nonvolatile data returned from the nonvolatile memory.

FIG. 3 shows a block diagram in accordance with an embodiment of the present invention to facilitate an isochronous integrity check of nonvolatile data returned from nonvolatile memory 36. The figure shows a read port 302 that receives NVM data over the memory interface 26 to be used as system data. The measurement & authentication engine 18 on the host side is an internal engine that continuously measures, within the restrictions of the measurement algorithm, the data returned from the core NVM device memory. Again, the private key 40 within nonvolatile memory 36 and the private key within processor 24 store an identical secret key used to validate information transferred between the processor and the nonvolatile memory. A control block 304 is connected to the measurement & authentication engine 18 to provide control over the measurement & authentication engine 18 and the compare block 306.

In operation, the measurement and authentication engine 18 recomputes authentication material based on the authentication scheme. Computed hash values are checked to verify matches to the transmitted hash value. HMAC may be used with iterative cryptographic hash functions such as, for example, MD5 or SHA-1, in combination with the secret shared key. Note that any change to the data or to the hash value results in a mismatch as determined by compare block 306, because knowledge of the secret key is required to change the message and reproduce the correct hash value. Therefore, if the original and computed hash values match then the message is authenticated, but a mismatch may indicate that the message sent over memory interface 26 has been tampered with.

Thus, the purpose of measurement & authentication engine 18, private key 20 and compare block 306 is to authenticate data read from storage in nonvolatile memory 36 and determine the integrity of that data. Measurement & authentication engine 18 generates the HMAC based on a message input and a shared secret key, using the same key and HMAC function as was used by the nonvolatile memory 36. Again, compare block 306 compares the result computed by measurement & authentication engine 18 with the received MAC from nonvolatile memory 36, and if the two values match, the message has been correctly received and the host processor is assured that the data has not been compromise.

The host processor may invoke NVM commands to return authenticated measurements and any supplementary command information (may be combined with initiation of new measurement interval). The return data may be placed in a buffer with authentication material or returned as part of the command based on the device implementation.

Due to the unpredictable nature of code/data access and the small granularity of blocks fetched by the host (cache lines), the architecture illustrated in these embodiments allows data accessed from non-volatile memory 36 to be simultaneously read and measured. The performance of runtime memory integrity checking of code or data read from non-volatile memory 36 may be useful in secure platforms using Execute-In-Place (XIP) memory that behaves as a ROM memory mapped to a particular address. The inventive process permits non-volatile memory 36 to be simultaneously read and measured, a process that may be referred to as an isochronous NVM measurement, where time-dependent data is delivered within defined time constraints to ensure synchronization with other timely information.

By now it should be apparent that embodiments of the present invention provide an execution environment to securely perform isochronous integrity checks that do not expose the authentication private key externally. The process accelerates integrity checking by reducing the period of integrity uncertainty in systems where code and data security are distinguishing features. The general system security architecture creates a secure execution environment resistant to virus attack by providing runtime integrity checks of NVM memory data. If the process steps are followed, assumptions met and all host generated and received authenticated measurements match then the conclusion can be drawn that data transfer has both authenticity and integrity.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A processor and nonvolatile memory interface, comprising:
    a first measurement and authentication engine in a nonvolatile memory arranged to continuously measure data read from the nonvolatile memory and compute an original hash value on the data; and
    a second measurement and authentication engine in the processor arranged to recompute a hash value on the data received over an interface from the nonvolatile memory that is compared to the original hash value;
    wherein the original hash value and the recomputed hash value are computed isochronously and continuously by delivering time-dependent data within defined time constraints to ensure synchronization with other time-dependent information in the processor.

2. The processor and nonvolatile memory interface of claim 1 further including a secret key storage in the nonvolatile memory and a secret key storage in the processor, where knowledge of a common secret key is needed to compute the original hash value in the nonvolatile memory and to recompute the another hash value in the processor.

3. The processor and nonvolatile memory interface of claim 2 wherein the secret key is used to validate information transferred between the processor and the nonvolatile memory based on cryptographic hash functions.

4. The processor and nonvolatile memory interface of claim 1 wherein a transfer of data through the processor and nonvolatile memory interface is authenticated when the original and the recomputed hash values match.

5. The processor and nonvolatile memory interface of claim 1 wherein the data is not authenticated when the original and recomputed hash values mismatch.

6. The processor and nonvolatile memory interface of claim 1 wherein the nonvolatile memory invokes a command to initiate a new interval of measurement when computing the original hash value for a range of data.

7. The processor and nonvolatile memory interface of claim 6 wherein the processor reads the data from the nonvolatile memory transferred over the processor and nonvolatile memory interface and a digest is stored for the range of data.

8. An interface to authenticate nonvolatile stored data comprising:
an engine in a nonvolatile memory arranged to continuously measure data read from the nonvolatile memory and compute an original hash value on the data read from the nonvolatile memory; and
an engine in the processor arranged to receive the data and the original hash value transferred via the interface and compute a recomputed hash value on the received data that is compared to the original hash value computed by the engine in a nonvolatile memory
wherein the original hash value and the recomputed hash value are computed isochronously and continuously by delivering time-dependent data within defined time constraints to ensure synchronization with other time-dependent information in the processor.

9. The interface of claim 8 further including a key storage in the nonvolatile memory and a key storage in the processor to provide a symmetric private key used by the engine in the nonvolatile memory to compute the original hash value and by the engine in the processor to compute the hash value on the received data.

10. The interface of claim 8 wherein the engine in the nonvolatile memory generates a hash-based Message Authentication Code (HMAC) based on the data read from the nonvolatile memory and the symmetric private key.

11. The interface of claim 10 wherein the engine in the processor generates a HMAC based on received data from the nonvolatile memory and the symmetric private key stored in the processor.

12. A method comprising:
invoking a command to a first engine in a nonvolatile memory to initiate a new interval of isochronous and continuous measurement on an unprotected memory range;
causing the first engine in the nonvolatile memory to generate a first hash-based Message Authentication Code (HMAC) value for the unprotected memory range in the nonvolatile memory that is transferred over an interface to a host processor, the first HMAC value generated with the new interval;
causing a second engine in the host processor to generate a second HMAC value, the second engine to generate the second HMAC value using stored reference digests;
delivering time-dependent data within defined time constraints to ensure synchronization with other time-dependent information in the processor based on the com s arison of the second HMAC value with the first HMAC value.

13. The method of claim 12 further comprising:
retrieving previously stored nonvolatile reference digests for unprotected ranges as stored in the host processor.

14. The method of claim 12, comprising
the stored reference digests to include a same key and same HMAC function as used by the first engine to generate the first HMAC value.

15. The method of claim 12 further comprising:
using a secure execution environment in the host processor to compare the first HMAC value with the second HMAC value and authenticate the delivered time-dependent data based on the comparison.

* * * * *

UNITED STATES PATENT AND TRADEMARK OFFICE
CERTIFICATE OF CORRECTION

| | | |
|---|---|---|
| PATENT NO. | : 8,572,374 B2 | Page 1 of 1 |
| APPLICATION NO. | : 11/799989 | |
| DATED | : October 29, 2013 | |
| INVENTOR(S) | : Brent M. Ahlquist | |

It is certified that error appears in the above-identified patent and that said Letters Patent is hereby corrected as shown below:

In the Claims

In column 6, line 18-19, in claim 12, delete "com s arison" and insert -- comparison --, therefor.

Signed and Sealed this
Twenty-sixth Day of August, 2014

Michelle K. Lee
*Deputy Director of the United States Patent and Trademark Office*